Jan. 2, 1940.    H. A. DAUM    2,185,628
TARGET
Filed Dec. 13, 1937    5 Sheets-Sheet 1
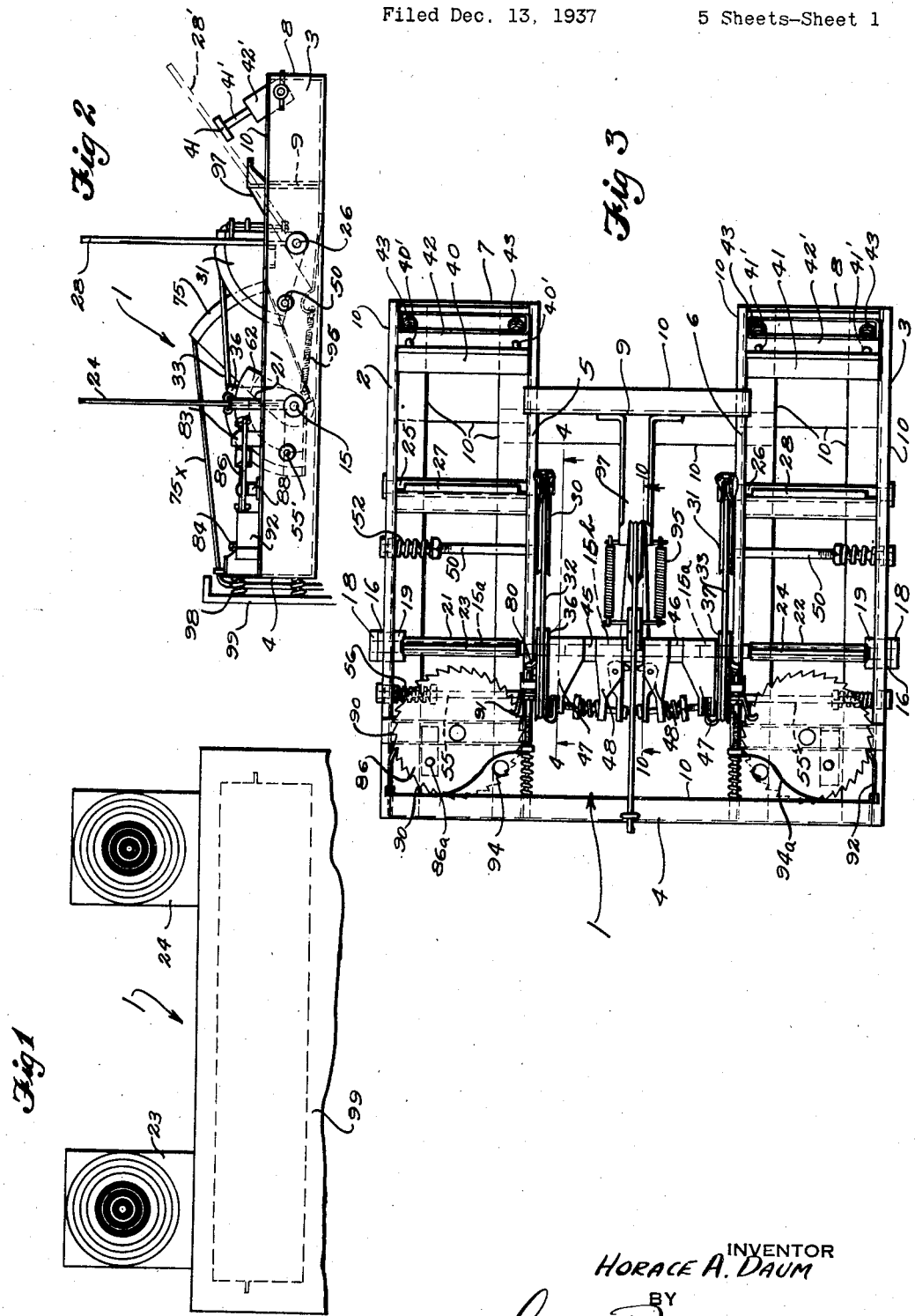
INVENTOR
HORACE A. DAUM
BY
Cooke Robinson ATTORNEY Jan. 2, 1940.  H. A. DAUM  2,185,628
TARGET
Filed Dec. 13, 1937   5 Sheets-Sheet 2
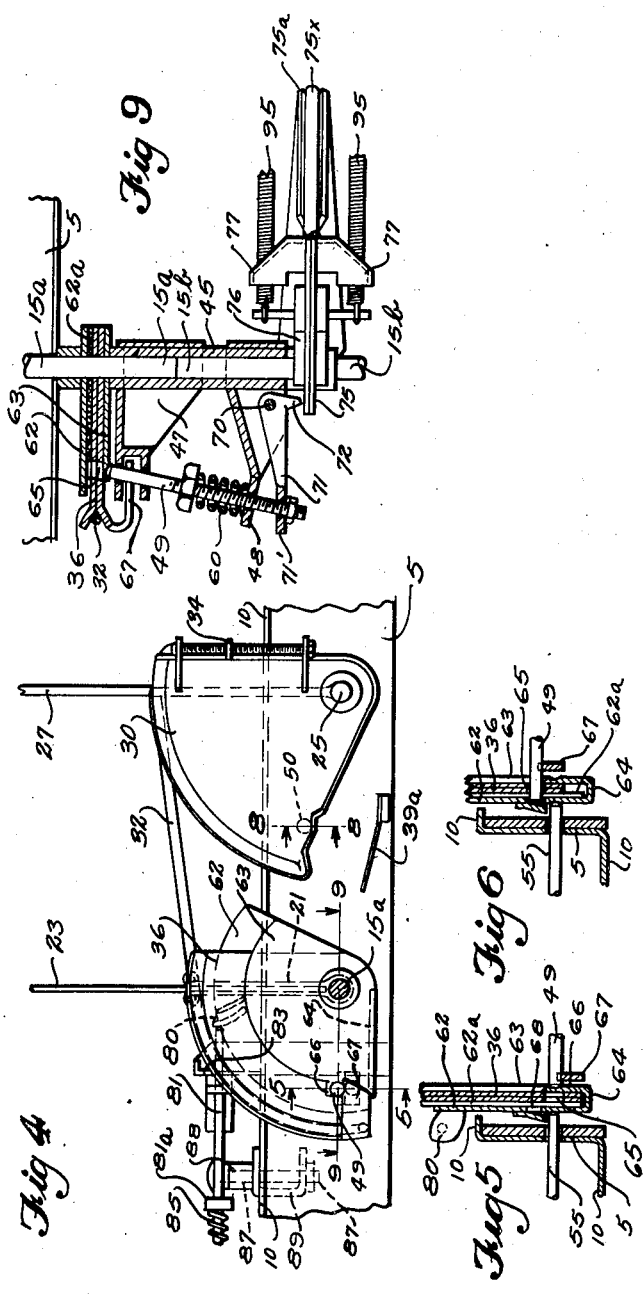
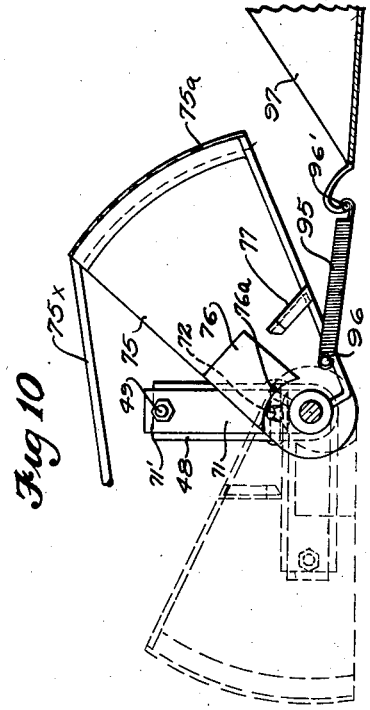
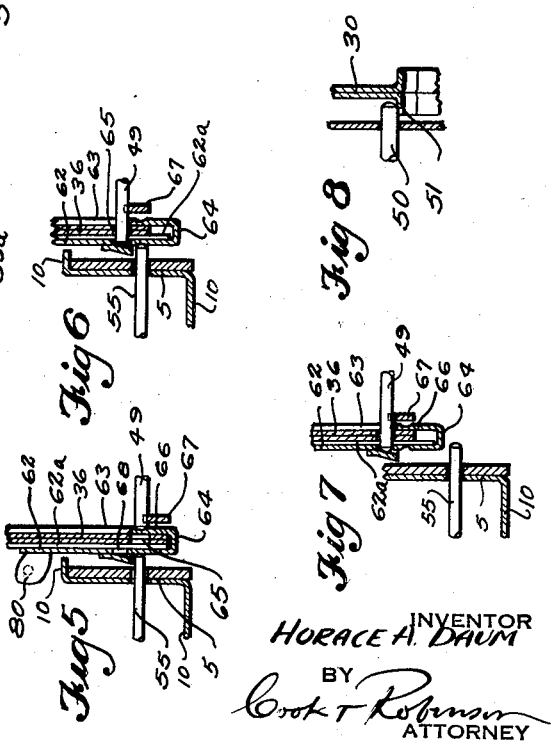
INVENTOR
HORACE A. DAUM
BY
Cook T Robinson
ATTORNEY Jan. 2, 1940.                H. A. DAUM                2,185,628
                              TARGET
                       Filed Dec. 13, 1937           5 Sheets-Sheet 3
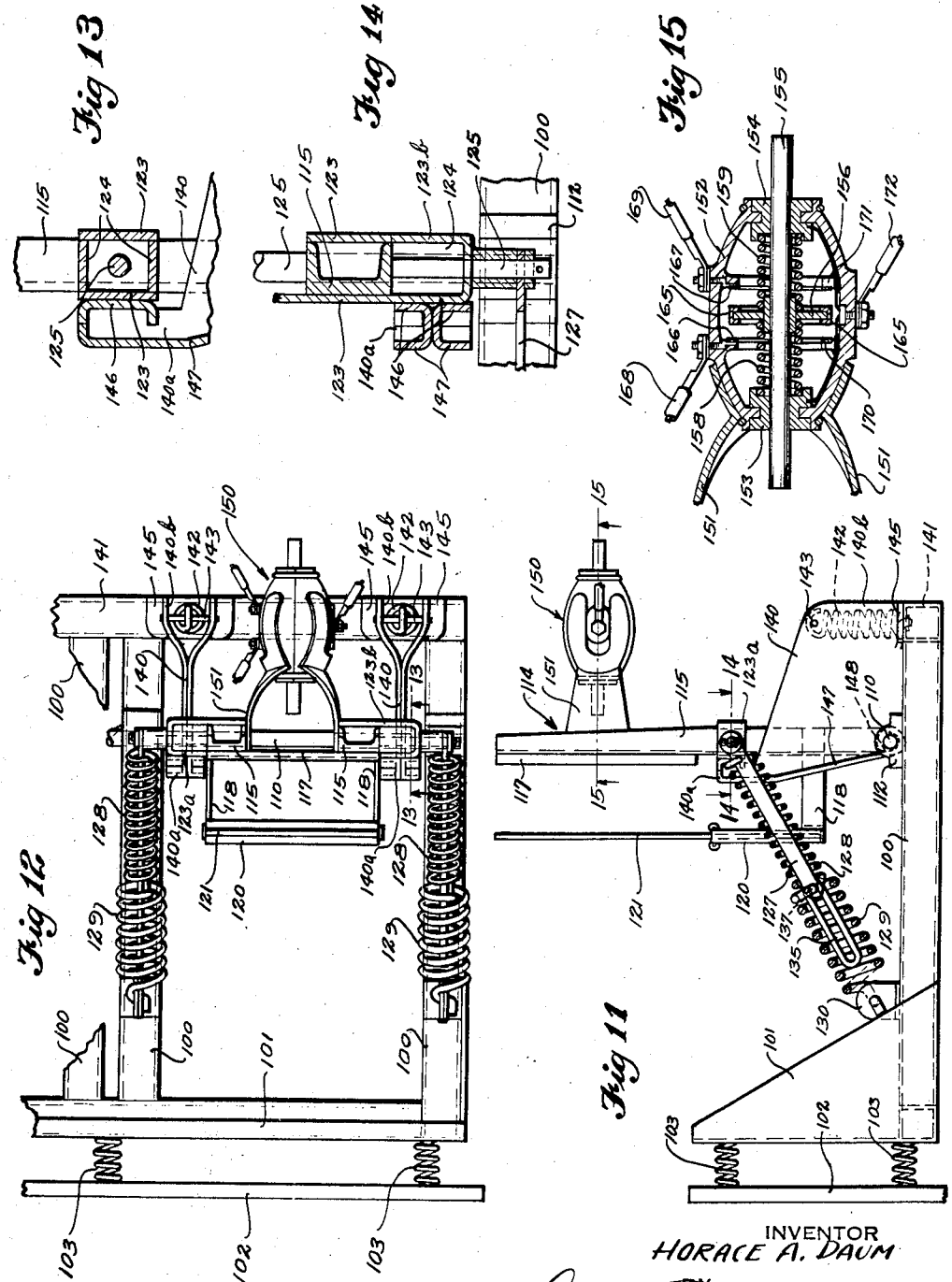
INVENTOR
HORACE A. DAUM
BY
Cook & Robinson
ATTORNEY

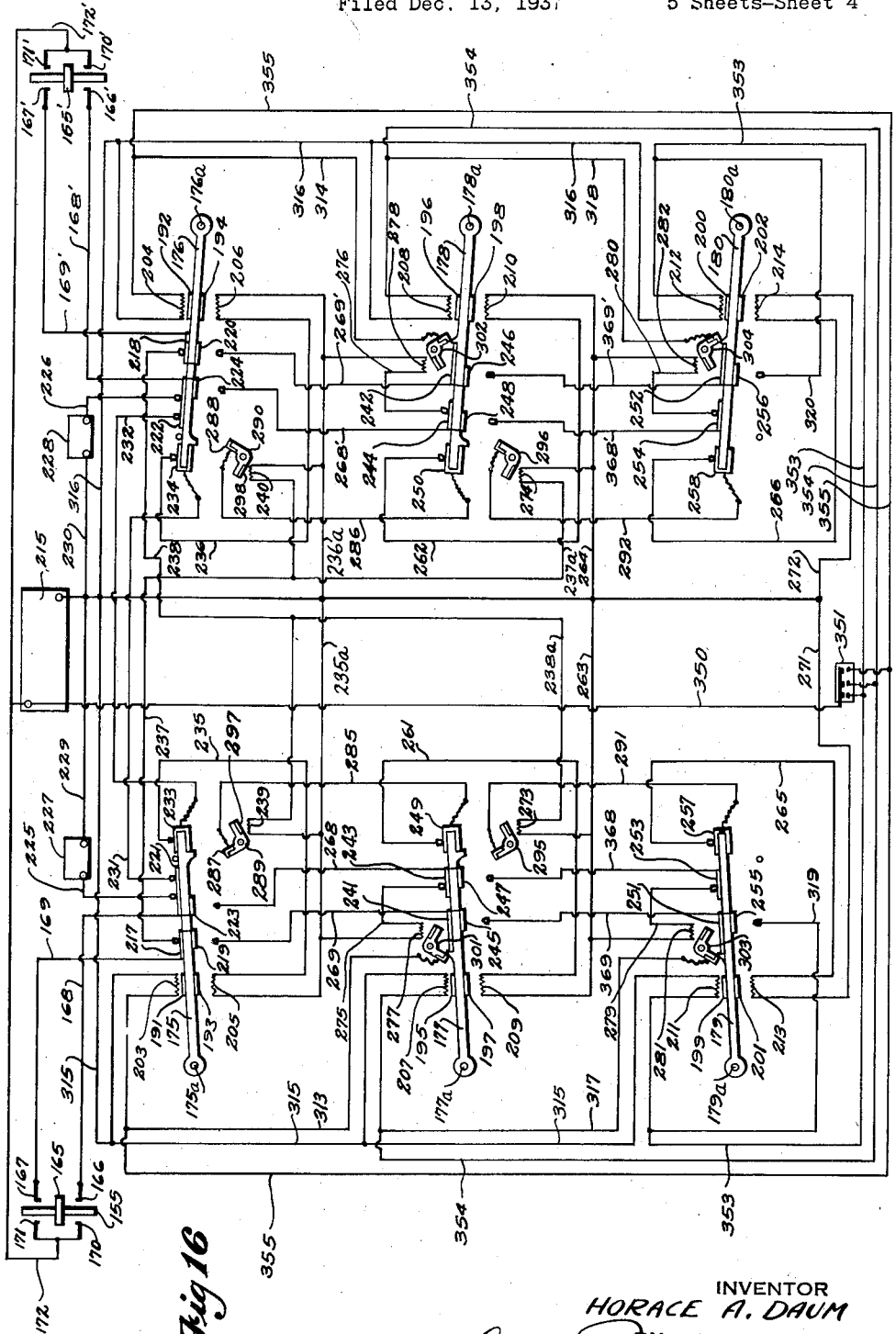

Jan. 2, 1940.   H. A. DAUM   2,185,628
TARGET
Filed Dec. 13, 1937   5 Sheets-Sheet 5
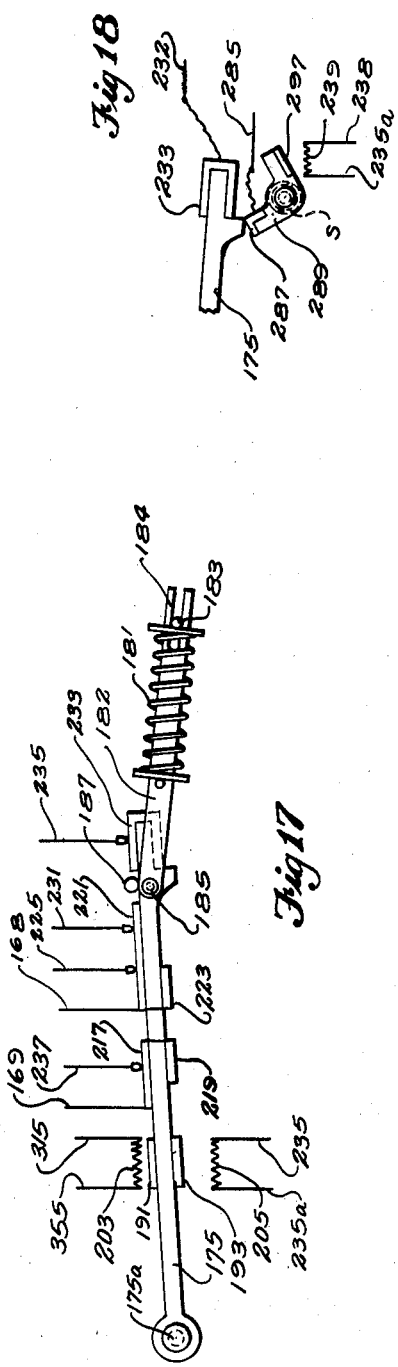
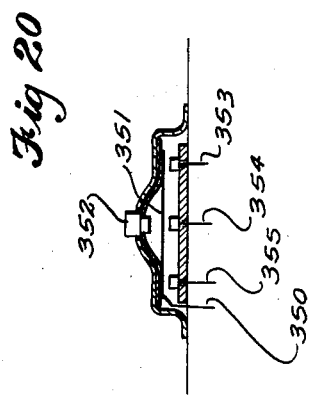
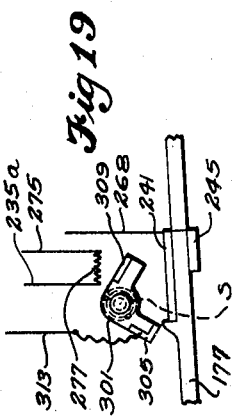
INVENTOR
HORACE A. DAUM
BY
ATTORNEY Patented Jan. 2, 1940

2,185,628

UNITED STATES PATENT OFFICE 2,185,628

TARGET

Horace A. Daum, Seattle, Wash.

Application December 13, 1937, Serial No. 179,508

6 Claims. (Cl. 273—102.1)

This invention relates to automatic indicating and recording targets for markmanship practising ranges, and more particularly to a mechanism provided with two, or more, targets and recording mechanisms whereby, in competitive shooting, the first "hit" will be indicated and recorded thereby.

It is the object of this invention to provide a mechanism for practise ranges, whereby two or more people may practise speed, in drawing, aiming and firing of a pistol, or rifle, and which will give the usual practise for accuracy and will register the "hit" of the faster marksman.

In markmanship practise and contests as heretofore followed, it has been the practise and custom for each participant to fire individually, the time for emptying a gun or firing a certain number of shots being timed by a referee with a stop watch. This is a very unsatisfactory means of competing, but by the use of the target herein disclosed, two or more people may shoot simultaneously, and the accuracy and results indicated so that they may be appreciated immediately. Furthermore, the use of a target arrangement of the present character is stimulating to the interest and actual competitive attitude of the participants, as well as providing excellent practise and training in markmanship.

Targets of this character are particularly useful in police and military training ranges, as well as an entertainment facility in public and private shooting galleries, and a series of such targets may be used at different distances to vary the competition. The devices herein illustrated are of simple construction, having two targets, but devices may be constructed with more than two, and requiring only slight modification of the illustrated structures.

In addition to the object previously stated, it is also an object to provide recording devices for at least two targets, with means whereby, in competitive shooting, where both marksmen draw together, and both hit their respective targets, only the one first hit will register the count.

In accomplishing the above and other objects of the invention, I have provided the improved details of construction, the preferred forms of which are illustrated in the accompanying drawings, wherein—

Fig. 1 is a front elevation of the present device, showing the targets extending above the protective guard.

Fig. 2 is a side elevation of the same.

Fig. 3 is a plan view of the device with the parts "set".

Fig. 4 is a vertical cross section on the line 4—4 in Fig. 3, showing the targets "set".

Figs. 5, 6 and 7 are sectional details, on line 5—5 in Fig. 4 illustrating movement of the target setting segments and function of the locking pins.

Fig. 8 is a vertical cross section on the line 8—8 in Fig. 4.

Fig. 9 is an enlarged, sectional detail on the line 9—9 in Fig. 4.

Fig. 10 is a vertical section on the line 10—10 in Fig. 3, particularly illustrating the target resetting lever.

Fig. 11 is a side elevation of an alternative form of construction.

Fig. 12 is a top view of the device of Fig. 11.

Fig. 13 is a section on the line 13—13 in Fig. 12.

Fig. 14 is a sectional view on the line 14—14 in Fig. 11.

Fig. 15 is a section on the line 15—15 in Fig. 11.

Fig. 16 is a wiring diagram illustrating the method of wiring and the switches and magnetic coils used in connection with the recording devices.

Fig. 17 is an enlarged view of the switch holding spring.

Fig. 18 is an enlarged view of the lower secondary switch.

Fig. 19 is an enlarged view of the upper secondary switch.

Fig. 20 is a detail of the resetting switch.

Briefly stated, the invention herein disclosed resides in the novelty of the particular arrangement of parts whereby, in a two-target device, the target first scored upon will be automatically lowered from vision, while the target being scored upon later remains erect and in full sight, together with mechanisms whereby the lowered target may be elevated again for further shooting, and the "hit" registered in the machine thereby.

Further provision is made in an alternative form of construction for the targets to remain upright in place when hit or scored upon, and including means for automatically indicating and registering the collective scores or "hits" of each participant, by electrically operated mechanism under control of the impact of the bullet which makes the hit.

Referring more in detail to the drawings—

1 designates, in its entirety, the target mechanism embodied in this invention. This comprises a frame formed by two horizontally disposed opposite side beams or walls, 2 and 3, which are joined together across their forward ends by a beam 4. Spaced inwardly from the side beams 2 and 3, somewhat apart and in substantially parallel relationship, are partition walls 5 and 6; the beams 2 and 5, and beams 3 and 6, being joined together across their rearward ends by end plates 7 and 8, respectively. A cross member or brace 9, spaced somewhat inwardly from the rearward end of the frame, is disposed between the partition walls 5 and 6. The side beams 2 and 3 and partition walls 5 and 6, as well as the end beams 4, 7 and 8, are flanged, as at 10, to add strength and rigidity to the frame structure.

Disposed transversely of the machine, slightly back of the forward end and between the beams 2 and 3, and passing through beams 5 and 6, is a cross shaft 15. This is rotatably mounted at its ends in bearings 16, and is equipped with retaining collars 18 and 19 which engage the bearings. This shaft is divided into three independently rotatable, coaxial sections, each of the outer sections being designated by 15a, and the central section being designated by 15b.

Mounted upon the outer sections 15a—15a of this shaft, respectively, are target holding sockets, 21 and 22; 21 being located between the side wall 2 and partition wall 5, and 22 between the wall 3 and partition 6. These target sockets are designed to hold the regulation cardboard targets 23 and 24 therein. The socket mounting shafts are rotatable, and mechanism associated therewith, presently to be described, provides that the lowering of one target by a "hit" sets the associated mechanism for registering the hit incident to a resetting of the target.

Rotatably mounted between the beams or walls 2 and 5, and between the beams 3 and 6, rearward of cross shaft 15, are separate cross shafts 25 and 26. These are disposed transversely of the framework. Plates 27 and 28, disposed directly behind the targets 23 and 24, are fixedly mounted upon these rotatable shafts and are adapted to swing from vertical positions to rearwardly inclined positions when actuated by impact of a bullet striking thereagainst after passing through the target from the front of the device.

Bumper plates 40 and 41 are mounted by rods 40' and 41', respectively, slidable in guides 42—42', and springs 43, as seen in Figs. 2 and 3, act against the rods, to ease the impact of the plates 27 and 28 when they are driven back, as shown in dotted lines 28' in Fig. 2, from the force of the bullet striking thereagainst.

Fixed to the inner ends of these shafts 25 and 26, respectively, just within the walls 5 and 6, are pulley segments 30 and 31. These segments are frictionally engaged, respectively, by pins 50 and 50' that are slidably mounted on the frame; the pin 50 being mounted between the walls 2 and 5, and the pin 50' being likewise mounted between walls 3 and 6. Each pin is urged inwardly by the action of a coiled spring 52 applied thereto, as seen in Fig. 8, to engage against a flange 51, formed on the lower edge of the corresponding pulley segment, thereby to yieldingly hold the segments against movement and the plates 27 and 28 in upright position while the device is "set".

Pulley segments 36 and 37 of slightly smaller radius, are rotatably mounted on the cross shafts 15a, aligned with the segments 30 and 31, and adjacent to the partition walls 5 and 6. Cables 32 and 33, respectively, overlie and connected the aligned segments 30 and 36, and segments 31 and 37 with adjustment means 34, and are fixed at their ends to these parts so that the rearward actuation of a plate 27 or 28 will rotate its corresponding segment 30 or 31, and by reason of the cable connections, this will cause a like action of the corresponding target.

Fixedly mounted upon the opposite ends of the inner section 15b of the cross shaft 15, are elongated collars 45 and 46 which rotatably contain the adjacent ends of the shaft sections 15a—15a, as seen in Fig. 9, and fixed to the ends of each of these collars are levers, or brackets 47 and 48; the levers 47 of each set being disposed closely adjacent the pulley segments 36 and 37, respectively. A target lowering pin 49 is slidably mounted in each set of brackets, as seen in Fig. 9, and each pin is yieldingly urged by a spring 60 toward locking engagement with its corresponding segment 36 or 37. The pins 49, as seen in Fig. 9, extend slidably through openings in the outer ends of the brackets or arms 47—48 and the springs bear against nuts on the pins and against the brackets 48.

At opposite sides of each of the disks 36 and 37, which are rotatable on their shafts, are disk segments 62 and 63, joined together across their lower ends by an integral connection as shown at 64 in Figs. 5 and 6 so that they will rotate together as a unit.

The disk 62 in each assembly has a layer of sheet cork 62a fixed to its inner side which acts as a friction surface. This acts to check or retard the movement of the segments 36 and 37.

Each of the target lowering segments 36 and 37 has a hole 65 therethrough in its outer edge portion, as seen in Figs. 5, 6 and 7, and with the segment in position of Fig. 5, and the target raised, the hole will be covered by a peripheral extension 66 of the overlying disk segment 63. This extension portion 66 serves as a stop for the pin 49 to keep it from entering the hole, as will be best understood by reference to Fig. 5. However, there is a hook-like portion 67 turned back from the outer edge of each of the pulley segments 36 and 37, and these hooks are adapted to engage against the pins, as noted by reference to Figs. 4 and 9, in a manner whereby, on the initial rotative movement of a disk 36 or 37 by reason of a "hit", the pin associated therewith will be lifted off the extension and permitted to enter the hole 65 in the segment and to pass on through and into a hole 68 in the target lowering disk 62 as shown in Fig. 6; it being understood that disk 62 is fixed to shaft section 15a and will rotate the shaft to throw the target back with its corresponding plate 27 or 28 when the latter is hit by a bullet.

The segments 36 and 37, respectively, are held yieldingly in "set" position by pin 55, slidably mounted between the walls 2 and 5, and a pin 55' likewise slidably mounted by walls 3 and 6. The pins are urged endwise into holding contact with their respective segments, as seen in Fig. 5, by springs 56, acting thereagainst. Each pin has a rounded inner end adapted to seat in a recess or indenture in the corresponding target elevating and lowering disc 62 which frictionally engages the adjacent segment 36 or 37.

Brackets 39, affixed to the inner partition walls 5 and 6 mount leaf springs 39a which are in position to act as yieldable stops or bumpers to be engaged by the pulley segments 36 or 37 when they are rotated rearwardly.

The means for withdrawing the pins 49 for resetting the targets is as follows: Pivotally mounted on a pin 70 within the formed side walls of each of the arms or brackets 48 is a bell crank lever arm 71, having a long lever 71' and a relatively short arm 72. The arm 72, as observed best by reference to Figs. 9 and 10, are positioned to be operatively engaged by cam blocks 76 fixed to opposite faces of a lever arm or segment 75 that is mounted for rotation about the shaft 15 between the collars 45 and 46. The cam blocks 76 have cam surfaces 76a adapted to be brought to bear against the arms 72 when the lever 75 is rotated forwardly. Also formed upon this setting arm 75 are paired brackets or lugs 77, so disposed thereon as to engage against the brackets 48, after the pin 49 has been disengaged, to rotate the brackets 47 and 48 upon the cross shaft 15 to a "set" position. The setting lever segment 75, after being actuated to set position, is automatically returned and held in an out of the way position while not in use, by spring 95 having ends fixed to pins 96 extending from the arm 75, and their other ends attached to a hook 96' at the end of a bracket 97 extending forwardly from the cross member 9 of the frame, as seen in Fig. 10.

The setting lever 75 is formed with a peripheral groove or trough 75a. A cable 75x is attached to the lever and lies within the groove. This cable is extended to a point forwardly of the target and when pulled on will swing the lever 75 forwardly to "set" the targets.

Fixedly attached to the disc segments 62, Fig. 4, and disposed to overlie the partition walls 5 and 6 during the movement of the segments from one extreme to the other, are outwardly extending ears or lugs 80, which operatively engage against push rods 81 mounted in brackets 83 and 84 on the walls 5 and 6. A spring 85 bears against an adjustable shoulder 81a on each rod to urge the rod in a rearwardly direction. Registering dials 86 rotatably mounted by shafts 87 through bearings 88 on transverse frame members 89 between walls 2 and 5, and likewise between walls 3 and 6, are provided with ratchet teeth 90 to be engaged by spring clip pawls 91 mounted upon the push rods 81. A spring 92, associated with each disk, engages the teeth to prevent backward movement of the disk. Numbers are placed on the disks 86 and may be read through the circular openings 94 in overlying plates 86a. A small handle 86a extends from each dial 86 upwardly through a hole therein from a leaf spring mounting on the under side of the disk; being so arranged that on pressing downward on the handle, and rotating the dial, the leaf spring will engage a stop to set the dial at zero.

Assuming the device to be so constructed and that it is in a "set" position, with both targets and back plates in a vertical position, as in Fig. 1, the use and operation of the machine would be as follows:

In the occasions that pistols are used in competitive shooting, the skill of the marksman is judged by the speed in drawing the pistol, aiming and shooting. When rifles are used, the skill would be judged by the speed of turning from an "at ease" position to a firing position, facing directly at the target, raising the rifle to the shoulder, aiming and firing.

For the purpose of simplifying the following explanation, let it be assumed that the left target 23, as seen in Fig. 1, is scored upon first. When the lead ball is fired from the gun, it passes through the cardboard target 23 and strikes the back plate 27. The momentum of the bullet causes this back plate 27 to swing backwardly and downwardly, rotating the shaft 25 and the pulley segment 30. The force of the impact of the bullet is sufficient to disengage the pulley segment from the pin 50 which yields to the pressure.

It is evident that when the pulley segment 30 is thus rotated, the cable connection 32 with the pulley segment 36 will cause the latter to also rotate. This causes the left hand target 23 to be lowered simultaneously with the back plate 27 for the reason that when the pulley segment 36 rotates on the shaft 15a, hook 67 turned rearwardly from the outer edge of the segment and underlying the pin 49, lifts the pin off the extended portion 66 of the disc segment 63, and the spring 60 causes the pin to be moved into the hole 65 in the pulley segment, and then into the hole 68 in the target lowering disc segment 62. This locks the pulley segment 36 and the disc segment 62 together and by reason of disk 62 being fixed on shaft 15a, it effects the lowering of the target simultaneously with the back plate.

Through this movement of the back plate 27, and the pulley segments 30 and 36 with the pin 49 engaged therein, the brackets 47 and 48 that hold the pin 49 also are rotated. It will be understood that the inner end portions of the shaft sections 15a serve as mounting spindles for the sleeves 45 and 46, and that the central section 15b of the shaft, to which these sleeves are fixed will all rotate therewith as a unit.

With reference to the action of the right hand target, it will be understood that when the two sets of brackets, carrying pins 49, swing rearwardly, the pin 49 associated with the disk 37 will be moved from the indenture in the extended portion 66 of the disk segment 63, at the right hand side, and since the segment 37 at that side is not moved, and the hole 65 is not in alignment therewith, but still covered by the extension 66, the pin slides easily over the surface of the pulley segment 37 without causing the segment to be rotated, and thus the target at the right remains upright.

Should a bullet strike the back plate 28 of the right side assembly after passing through the target 24, the target will not be lowered because, with the pin 49 already moved out of locking position by the lowering of the left-hand target, the pulley segment 37 is merely rotated on the shaft 15a. This, of course, leaves the target 24, which is hit later than target 23, in a vertical position.

To reset the machine for operation, the cable 75x attached to the segment lever 75 and leading forwardly over the front wall, to the point from where the shooting is being done, is pulled in to rotate the lever forwardly and cause the lugs 77 therein to engage the brackets 48 and rotate the bracket assemblies back to "set" position in which they are shown in Fig. 1.

Spaced outwardly from and mounted in front of the frame by springs 98, is a heavy metal guard plate 99 to protect the target mechanism from chance stray or low bullets. The target mechanism will be mounted approximately 4 to 5 feet from the ground level, or near to shoulder or eye level, and this metal guard need extend no lower than is necessary to protect the mechanism of the target.

As an alternate form of construction, I have provided a target and back plate, which is held in a vertical position by a spring arrangement, and has associated therewith a switch arrangement to be closed in an electrical circuit, by the impact of a bullet to electrically record the "hit" as illustrated in Figs. 11 to 20.

Longitudinal frame members 100 are provided with brackets 101 at their forward end to hold a protective plate 102 mounted by springs 103. A cross shaft 110 is mounted in bearing blocks 112 to rotatably support the target unit 114. This unit consists of channels 115, having joined thereto at their upper end the metal back plate 117, upon which the bullet impinges after passing through the target 121. Medially of the channels 115 and extending forwardly therefrom are brackets 118 mounting the target clip 120, in which is held the regulation cardboard target 121.

A brace strap 123 is joined to the channels 115 somewhat below the back plate 117, the ends of which form the encircling extensions 123a and 123b. These extensions reinforced with inserted plates 124, mount at their outer end the studs 125.

Pivotally mounted upon these studs 125, and inclined forwardly and downwardly toward the frame member 100, is the lever 127, and the springs 128 and 129 associated therewith. It will be seen in Figs. 11 and 12 that the springs 128 and 129 encircle the lever 127, the spring 128 being attached to the lever at its upper end, and at its lower end attached to the spring 129. At its lower end, the spring 129 is mounted by an ear 130 extending upwardly from the frame member 100. An elongated slat 135 in the lower end of the lever 127 slidably receives a cross piece 137 formed from a coil of the spring 129 at its upper end.

Pivotally mounted on the cross shaft 110, just outside of each channel 115, are brackets 140, having an upwardly extending arm 140a disposed to abut against the extensions 123a and 123b, and a longitudinal arm 140b extending rearwardly and disposed to overlie and rest upon a cross member 141 of the frame. An extension spring 142, fastened to this bracket at its upper end by a pin 143 and to the cross member 141 of the frame at its lower end holds this bracket 140 in a forwardly yieldable position. This bracket is constructed of two metal plates that may be welded, riveted, or otherwise joined together, with the arm part 140b flared apart for the reception of the spring 142.

Flanges or feet 145 formed outwardly from the arm 140b rest upon the cross member 141, and add strength to the arm. The arm 140a is reinforced with flanges, as at 146 and 147. The flange 146 is so disposed as to abut against the extensions 123a and 123b, while the flange 147 extends to the mounting bearing 148 of the bracket 140, thereby strengthening the arm 140a.

Mounted upon the back of the plate 117 by brackets 151 is a switch arrangement, designated in its entirety by the reference numeral 150. This switch consists of a housing 152, closed at both ends by aligned bushing 153 and 154, and having a plunger 155 therein, with an encircling flange 156. Springs 158 and 159 bearing against the end walls 153 and 154, and also against the flange 156, yieldingly hold the plunger 155 in a centered position within the housing 152. The aligned bushings 153 and 154 permit the easy sliding motion of the plunger 155.

Around the edge of the flange 156 is placed a metal strip or edging 165 to serve as an electrical contact, and spaced equally from this flange 156, at one side of the housing 152, are the electrical contact points 166 and 167, having lead wires 168 and 169 attached thereto. At the opposite side of the housing 152 are joined electrical contact points, 170 and 171, which are formed from one continuous piece of metal, and has a lead wire 172 connected thereto.

By referring to Fig. 16, the wiring of the switches 150 with the recorder and other relay switch will now be explained: Switches 175, 176, 177, 178, 179 and 180 are arranged in series for each target unit. These switches are constructed of a non-conductor, such as fibre, having metal contact plates thereon and are pivoted at their outer end, as at 175a, 176a, etc. These switches are held in either an "up" position, or a "down" position, as illustrated in Fig. 17.

A spring 181, fastened to and encircling a lever 182, bears against a fixed stud 183. A slot 184 in the lever 182 holds it slidably in position thereon. A pin 185 holds the lever 182 pivotally affixed to the switch 175, and urges it against the stop stud 187 when in an "up" position. When it is operated downwardly past dead center, it rests on the secondary switch 289, as illustrated in Fig. 18. It is obvious that such an arrangement will hold the switch in one position until it is operated to the other position as will be presently described. It should be understood of course that the spring 181 is a very weak spring.

Close to the pivoted end of the switch are mounted the metal plates 191 and 192, 193 and 194, 195 and 196, 197 and 198, 199 and 200, and 201 and 202, on the right and left hand switches, upper and lower sides thereof respectively, which will be attracted to the electro-magnetic coils 203 and 204, 205 and 206, 207 and 208, 209 and 210, 211 and 212, and 213 and 214, located adjacent the right and left hand switches, upper and lower sides thereof. When one of these electro-magnetic coils is energized, the switch will be operated through the magnetic attraction for the metal plates. It will be here stated that the normal position for these switches is the "up" position, and that they are operated to a "down" position by the lower coil, and subsequently re-set to an "up" position by the upper coil for the succeeding operation.

The wires 172—172' are connected to the positive terminal of a battery 215, and the wires 169 and 169' are connected to a metal contact plate 217 on the switch 175 and on the switch 176 to a metal contact plate 218. The contact plate 217 is connected to a contact plate 219 on the lower side of the switch and likewise the contact plate 218 is connected to a contact plate 220. These contact plates 219 and 220 lie directly beneath the contact plates 217 and 218, as are the same plates on the other switches, as will presently be described.

The wires 168 and 168' are connected to contact plates 221 and 222, respectively, and connected to these are the contact plates 223 and 224 which directly underlie them. The wires 225 and 226, having yieldable points thereon to contact the plates 221 and 222 connect with recorder units 227 and 228 respectively, having neutral return lines 229 and 230 which complete the circuit to the negative pole of the battery 215. The wires 231 and 232, having yieldable contact points thereon to contact the plates 221 and 222, connect with the end plates 233 and 234 of the switches 175 and 176 respectively. The lines 235 and 236, having yieldable contact points thereon to contact the plates 233 and 234 respectively, lead to the coils 205 and 206 and have a neutral or return line 235a and 236a. Wires 237 and 238 having yieldable contact points thereon to contact the plates 217 and 218, connect respectively to the electro-magnet coils 240 and 239, completing the circuit through lines 235a and 236a.

On the upper sides of the switches 177 and 178 are the plates 241 and 242, 243 and 244, and on the lower side are the plates 245 and 246, 247 and 248, and end plates 249 and 250, respectively. Likewise, on the upper sides of the switches 179 and 180 are the plates 251 and 252, 253 and 254, and on the lower side are the plates 255 and 256, and end plates 257 and 258, respectively.

Contact plates 241, 243, 242 and 244 are connected to the contact plates 245 and 247, 246 and 248, respectively, and the contact plates 251 and 252 are connected to the contact plates 255 and 256, respectively. The wires 268 and 268', having yieldable contact points thereon to contact plates 223 and 224, are connected to the plates 243 and 244; the wires 269 and 269', having yieldable contact points to contact plates 219 and 220, being connected to the plates 241 and 242. Also the wires 368 and 368', having yieldable contact points thereon to contact the plates 247 and 248, are connected to the plates 253 and 254; the wires 369 and 369', having yieldable contact points to contact the plates 245 and 246, being connected to the plates 251 and 252.

Lines 261 and 262, having yieldable contact points thereon to contact plates 249 and 250, connect with the electro-magnetic coils 209 and 210, and complete the circuit to the negative post of the battery 215 through the lines 263 and 264, respectively. Likewise the lines 265 and 266, having yieldable points thereon to contact the plates 257 and 258, connect to the electro-magnetic coils 213 and 214, and complete the circuit to the negative post of the battery 215 through the lines 271 and 272.

It will be noted that the lines 238a and 237a, which are continuations of the lines 238 and 237, lead to the electro-magnetic coils 273 and 274, and complete their circuit through the lines 263 and 264 to the negative post of the battery 215, respectively.

The lines 275 and 276, having yieldable contact points thereon to contact the plates 243 and 244, lead to the electro-magnetic coils 277 and 278, and complete their circuits through the lines 235a and 236a. Likewise, the lines 279 and 280, having yieldable contact points thereon to contact the plates 253 and 254, lead to the electro-magnetic coils 281 and 282, and complete their circuits through the lines 263 and 264.

The lines 285 and 286, connected to the end plates 249 and 250, connect to the contact plates 287 and 288 on the secondary switches 289 and 290 respectively, as seen in Fig. 18, and likewise the lines 291 and 292, connected to the end plates 257 and 258, connect to the contact plates 293 and 294 on the secondary switches 295 and 296. These secondary switches, constructed of a non-conductive material, are pivotally mounted and close a circuit through the end plates on the primary switches when so operated against a spring S by the electro-magnetic coils acting on the metal plates 297 and 298, 299 and 300, respectively.

Also, the secondary switches 301, 302, 303 and 304 are similarly constructed, as seen in Fig. 19, being pivotally mounted so that they make a contact with the plates 241 and 242, 251 and 252, respectively, through the contact plates 305 and 306, 307 and 308. These switches are operated by the electro-magnetic coils 277 and 278, and 281 and 282 attracting the metal plates 309 and 310, 311 and 312.

The secondary switches (Figs. 18 and 19) contain coil springs to throw the switch back when the primary switch is urged to the opposite side. The purpose of the lip on the primary switch, back of the metal contact plate, is to hold the secondary switch in place.

The lines 313 and 314, connected to the plates 305 and 306, lead to the electro-magnetic coils 203 and 204, completing their circuit through the lines 315 and 316. Likewise the lines 317 and 318 connected to the plates 307 and 308, lead to the electro-magnetic coils 207 and 208, and complete their circuits through the lines 315 and 316. The lines 319 and 320, having yieldable contact points thereon to contact the plates 255 and 256, lead to the electro-magnetic coil 211 and 212, completing their circuits through the lines 315 and 316.

A line 350, which is connected to the positive of the battery 215, leads to a contact plate 351 of a resetting switch designated by reference numeral 352, as seen in Fig. 20, which, when closed, completes circuits through the wires 353 and 354 and 355, to the electro-magnetic coils 203 and 204, 207 and 208, 211 and 212, and completes the circuit through the lines 315 and 316. This energizes the electro-magnetic coils and effects the resetting of the primary switch to an "up" position.

Considering the device to be so constructed, its operation would be as follows: A bullet fired at the target 121 pierces it and strikes or impinges upon the metal back plate 117, causing the target unit 114 to swing or pivot backwardly upon the cross shaft 110. The spring 128 yields and allows the target unit to swing back to the extent of the length of the slot 135 in the lever 137; the spring 128 fastened to the spring 129 and to the lever 127, extends and allows the target unit to pivot rearwardly. The spring 129 pulls the target forwardly when the lower end of the slot 135 pulls on the cross piece 137 of the spring therein engaged. Upon swinging forward, the extensions 123a and 123b strike against the flanges 146 on the arms 140a of the bracket 140; the spring 142 absorbs the shock of the impact, and the two spring arrangement holds the target unit 114 vertical ready for the next shot to be fired.

The recording of the first "hit" is accomplished through the electrical circuit closed by the switch 150, which is mounted upon the rearward side of the plate 117. When the target swings back, the plunger 155 is held by the inertia of its own weight in substantially an unmoved position, and the circuit to the recorder is closed by the edging 165 on the disc 156 contacting the points 166 and 170. This is a momentary contact, and the force of it moves the plunger rearwardly, breaking the circuit at the end of the motion of the target. At the same time that the circuit to the recorder is closed, a circuit is also closed that renders the other recorder inoperative and isolated from the circuit, through the switch 175, as will be presently explained. As the target moves back to a normal position, the plunger again has a tendency to remain motionless by reason of inertia and the edging 165 on the disk 156 closes a circuit between the contacts 167 and 171, which brings the switch 177 into the circuit that will operate upon the following operation of the switch 150' or 150, as the case may be. This arrangement records the first to score, but does not record the second, as will now be explained.

Assuming that the right hand target is "hit" first and then the left hand hit, the operation of the recording control mechanism would be as follows:

Upon the closing of the circuit between the contact points 170' and 166' by the edging 165' upon the disk 156, the current is carried from the positive of the battery 215 through the line 172', through the line 168' to the contact plate 222. Since the switch 176 is in its normal "up" position, a circuit to the recorder 228 is closed through the line 226 and completed to the negative of the battery 215 through line 230. At the same time a circuit is completed through the line 232 to the end plate 233, and since this switch is also in its normal "up" position, the circuit is closed through the line 235 to the electro-magnetic coil 205 and then completed through the line 235a to the negative of the battery 215. This energization of the electro-magnetic coil 205 attracts the plate 193 and snaps the switch 175 to its "down" position. Then upon the closing of the circuit between the contact points 171 and 167 by the edging 165 on the disc 156, current is carried by the line 169' to the contact plate 218, and since the switch 176 is in its normal "up" position, a circuit is completed through the line 238 to the electro-magnetic coil 239, returning through the line 235a to the negative of the battery 215. Upon energization of the coil 239, the secondary switch 289 is operated by the magnetic attraction for the plate 297 which causes the switch to pivot on its pin mounting, bringing the contact plate 287 into a locked contact with the end plate 233. This connection permits the operation of the next switch 177 in case of complete failure of the left hand target to be hit, as will be subsequently dealt with.

Now, the first shot has hit and been recorded, and the second or left-hand target is hit, with no recording, as will now be described.

Upon the closing of a circuit between the contacts 170 on the line 172 and the contact 166 on the line 168 by the edging 165 on the disk 156, the current is carried by line 168 to the contact plate 221. But since the switch 175 has been operated to a down position by the first hit on the right-hand target no recording is possible, since the circuit is broken between the contact plate 221 and the line 225 to the recorder 227. However, with the contact plates 221 and 223 joined together and with the switch 175 in its "down" position, a circuit is thereby completed through the line 268 to the contact plate 243, through the line 275 to the electro-magnetic coil 277, returning through the line 235a to the battery 215. This energization of the coil 277 attracts the metal plate 309 to the coil, causing the secondary switch to operate by pivoting on its mounting pin and bring the contact plate 305 into locked contact with the contact plate 241.

Then, upon the closing of the circuit between the contact 171 on the line 172 and the contact 167 on the line 169 by the edging 165 on the disk 150, current is carried to the contact plate 217, and with the switch 175 in a "down" position as described, through the contact plate 219, through the line 269 to the contact plate 241. Since the secondary switch 301 is closed, the current will pass therethrough to the line 313 to the electromagnetic coil 203, and return through the line 315 to the battery 215. Upon the energization of the coil 203, the switch is returned to an "up" position through the attraction for the plate 191.

Now, the right hand target has been hit and recorded, and the left-hand target has been hit, but not recorded. The operation of the mechanism will be identical for each shot as just explained, as long as only one shot is in advance of the other. It is also evident that both right and left-hand mechanisms, when one is hit first, will isolate the recorder from the other target circuit. It will be noted that switches 175 and 176, 177 and 178 and 179 and 180 are three different switches; however, it will be here stated that the first switch and the last switch; i. e., 175 and 176, and 179 and 180, remain the same, and that the intermediate switches 177 and 178 may be in plurality, to say the amount of four, so that there are six switches on each target control for six successive competitive shots, for purposes to be now described.

Should the left-hand target be missed, or should the right hand target be hit twice, or more times, before the left target is hit, or should the right-hand target at any time be hit more than once successively, the second switch will be brought into operation, and the left hand target will have to be hit that same number of times to catch up and record a hit. This is true of either side, should one be ahead of the other.

With the left switch 175 operated to a down position by the first shot or hit upon the right target, and a second hit thereon before the left target is hit, the operation will be different in that the current will be carried through the line 285 from the end plate 233 being in contact with the contact plate 287 on the secondary switch 289, to the end plate 249 on the switch 177, thence through the line 261 to the electromagnetic coil 209, returning through the line 263 to the battery 215. This coil 209 will operate the switch 177 to its "down" position. The second impulse, of the current from the line 169' will set the secondary switch 295 in position to operate the switch 179. The successive operations are identical in all respects hereafter and will not be further dealt with because of their simplicity.

The device herein illustrated and described, is in its simplest form, and may be enlarged to suit. As mentioned, the switches 177 and 178 may be in plurality as to bring the total number of switches to six or more, to accommodate a six shot revolver, or say to fifteen to accommodate rifle shooting. However, it is not probable that in competitive shooting of this nature that any one contestant will ever be more than 33⅓% faster than the competitor; hence, such an enlargement of the device may never be necessary.

After one shooting contest, or use, to reset the recording control mechanism in proper order to register or record the next contest shots or "hits", the button 352 is pressed, which will complete a circuit to the upper electromagnetic coils 203 and 204, 207 and 208, 211 and 212, and in this way, by completing the circuit through the lines 315 and 316, operate all the switches to their normal "up" positions so as to be in readiness for the next contest.

It is not intended that the device be limited to the details herein disclosed and described, but that it should be given an interpretation commensurate to the spirit and scope of the invention.

Having thus described my invention, what I claim as new therein and desire to secure by Letters Patent is—

1. A device of the character described, comprising a frame, a pair of movable supports, a target mounted by each support and normally held in upright position thereby, a plate located back of each target normally in position to be struck and moved by a bullet passing through the target, a support for each plate adapted to be moved with the plate incident to the latter being struck, a mechanism operatively connecting each plate supporting means with its corresponding target supporting means whereby to lower the target incident to the plate being moved, and means adapted to be actuated by such movement of one plate to render the connecting mechanism of the other target ineffective for lowering the target.

2. A device as in claim 1 including means whereby restoration of a struck plate and its target to normal position restores the operating connection of the other target and its plate to functional positions.

3. A device of the character described, comprising a frame structure, a pair of target supports rotatable therein, a target normally held in exposed position by each of said supports, an impact plate located back of each target, a rotatable support for each plate, said plates and supports being adapted to be moved incident to being struck by a bullet passing through their respective targets, means connecting each of the plate supports with the rotatable supports for the corresponding targets, whereby the movement of a plate when struck will effect the lowering of its target, and mechanism operable by movement of a target first moved to render the lowering mechanism of the other target ineffective and to lock the target against lowering.

4. A device as in claim 1 wherein means is provided for remote manual operation to restore a lowered target and plate to normal position.

5. A device of the character described, comprising a frame structure, a pair of target supports mounted therein to rotate about a horizontal axis, a target normally held in upright position by each of said supports, an impact plate located back of each target to rotate on an axis parallel with the axis of the corresponding target support; said plates being adapted to be driven back from upright position upon being struck by a bullet passing first through the corresponding target, a pulley segment fixed on the axis of each plate support, segments rotatably mounted on the target supports and alined with the pulley segments of their respective plate supports, cables extended about and fixed to the alined segments whereby the rotation of a plate upon being struck will cause a like rotation of the segment of the corresponding target support, and means for locking the segment of the target support with the support to rotate the latter.

6. A device as in claim 5 wherein means connects the segments of the two target supports whereby the rotation of the target first struck prevents rotation of the other target.

HORACE A. DAUM.